United States Patent
Notz et al.

[11] Patent Number: 5,632,336
[45] Date of Patent: May 27, 1997

[54] METHOD FOR IMPROVING INJECTIVITY OF FLUIDS IN OIL RESERVOIRS

[75] Inventors: Phillip K. Notz, Sugar Land; John Prieditis, Houston; James F. Stevens, Katy, all of Tex.

[73] Assignee: Texaco Inc., White Plains, N.Y.

[21] Appl. No.: 281,820

[22] Filed: Jul. 28, 1994

[51] Int. Cl.⁶ .................................................. E21B 43/16
[52] U.S. Cl. ............................................. 166/402; 166/403
[58] Field of Search ............................. 166/273, 291, 166/285, 298, 297, 274, 305.1

[56] References Cited

U.S. PATENT DOCUMENTS

| | | | |
|---|---|---|---|
| 2,623,596 | 12/1952 | Whorton et al. | 166/274 |
| 3,033,288 | 5/1962 | Holm | 166/273 |
| 3,102,587 | 9/1963 | Holbrook et al. | 166/274 |
| 3,220,473 | 11/1965 | Holm | 166/273 |
| 3,334,688 | 8/1967 | Blackwell et al. | 166/273 |
| 3,557,873 | 1/1971 | Owens | 166/274 |
| 3,637,015 | 1/1972 | Holm | 166/273 |
| 4,899,817 | 2/1990 | Djabbarah | 166/274 X |

*Primary Examiner*—Stephen J. Novosad
*Attorney, Agent, or Firm*—James L. Bailey; Kenneth R. Priem; Harold J. Delhommer

[57] ABSTRACT

A method is provided for increasing the rate of injection of flooding fluids into injection wells. A slug of polar solvent or a mixture of polar solvent and non-aqueous flooding fluid is injected into the injection well to displace aqueous and hydrocarbon liquids in the rock surrounding the injection well. Thereafter, the solvent is removed from the vicinity of the injection well by flooding fluid. The process may be repeated following each time water is injected into the injection well.

7 Claims, 3 Drawing Sheets

METHOD FOR IMPROVING INJECTIVITY OF FLUIDS IN OIL RESERVOIRS

FIELD OF THE INVENTION

This invention relates to improved recovery of petroleum from underground reservoirs. More particularly, injectivity of fluids used for enhanced recovery is increased by polar solvents injected ahead of or along with a non-aqueous enhanced recovery fluid.

BACKGROUND OF THE INVENTION

A variety of processes have been used for displacing petroleum that is not recovered by natural depletion or by water flooding from a subterranean reservoir. The enhanced recovery fluids used for displacing the petroleum may be classified as aqueous and non-aqueous. In general, these processes involve injecting an aqueous solution of a chemical or a non-aqueous fluid into the reservoir through injection wells, driving the fluid from one well to the other, and recovering oil ahead of the fluid through production wells. The processes are often applied after the production wells are producing only water. There can be a significant time lapse from the time the enhanced recovery fluid is injected into injection wells and the time the additional oil to be recovered by the process is fully recovered from production wells. This delay in time causes extra operating expense for the recovery process and extra investment cost, since the injection fluid must be purchased at the beginning of the enhanced recovery process. It is generally desirable to complete the recovery process in as short time as feasible.

The rate at which fluids can be injected into wells normally limits the rate at which recovery processes can be operated. The rate of fluid injection is determined by the reservoir permeability around the well to the fluid being injected, the viscosity of the fluid, the well spacing and the pressure of injection. Injection pressure is often limited by fracturing pressure of the formation where the fluid is being injected. If injection pressure is so high as to create hydraulic fractures, the flow pattern during the displacement of the petroleum is drastically affected and sweep efficiency of the enhanced recovery fluid may be greatly reduced. Also, the expensive recovery fluid may be lost to surrounding formations through a fracture.

Since the flow velocity of fluid near an injection well is much higher than at a remote location from the well, the permeability to the enhanced recovery fluid very near the well has a much greater effect in determining injection rate of the fluid. The permeability to flow of a fluid is dependent on the saturation or amount of other fluids present in the pore spaces near the injection well. The term "relative permeability" is used to describe the ratio of the permeability to a particular fluid in the presence of other fluids within the pore space to the absolute permeability of a rock. The relative permeability of each fluid increases as the saturation of that fluid increases within the pore space. Therefore, if the saturation of a fluid being used to flood a reservoir can be increased in the near-wellbore region, the permeability to that fluid can be increased. If the permeability is increased in the near-well region, where velocities are highest, the enhanced recovery fluid can then be injected at a higher rate.

Relative permeability data are obtained for reservoir rock in laboratory experiments using core samples cut from the reservoir of interest. The data for a particular fluid depend on the geometry of the pore spaces of a particular type of rock, the wetting conditions of the surface of the rock, and the properties of other fluids present. The effect of a change in saturation of a particular fluid on the permeability of another fluid can be measured directly by measuring changes in the permeability to the second fluid. The effect in different rock samples will vary considerably, depending on the properties of that particular rock.

In displacing one fluid by another in rock, there are immiscible and miscible displacements or floods. The miscible displacements replace one fluid with another with which it is miscible, the displacement being subject to mixing and dispersion processes in the rock matrix. The fluid with which the displacement fluid is not miscible may not be displaced below a certain saturation in the pore spaces, but will be displaced to lower saturations if co-solubility exists between the immiscible fluids. Since the volume near an injection well that must be affected to alter saturations of the fluids and relative permeability to a fluid is such a small fraction of the total volume of a reservoir to be flooded for enhanced oil recovery, processes can be considered for altering the near-well permeability to a fluid that are not suitable, because of mixing and dispersion, lack of miscibility, cost of the fluid or other reasons, for flooding a reservoir for enhanced oil recovery.

The most widely used flooding process for increased oil recovery has been carbon dioxide flooding. Carbon dioxide has a critical pressure and temperature lower than the pressure and temperature of most oil reservoirs, so it is injected as a super-critical fluid. Under most reservoir conditions, it is not miscible with the reservoir water, and it may or may not be miscible with the reservoir oil. However, even if the carbon dioxide is not completely miscible with the reservoir oil, it can be highly soluble in the oil and can cause the oil phase to swell in volume and decrease in viscosity. It may cause heavier hydrocarbons in some crude oils to separate and form a material that can block pore spaces of the rock.

Carbon dioxide injection is often followed by water injection. Commonly, alternate slugs or banks of water and carbon dioxide are injected, to prevent the low-viscosity carbon dioxide from rapidly fingering through a reservoir and to increase the conformance or sweep efficiency of the carbon dioxide flood. The relative permeability to carbon dioxide is determined by the saturation of both the water and oil in the pore spaces of the rock. The very reason the water banks are injected, however, to decrease mobility of carbon dioxide in the rock, is counter-productive when injectivity of carbon dioxide is considered. The injection rate of carbon dioxide becomes limited by the high saturation of water around injection wells. The same effects occur when the enhanced recovery fluid is another non-aqueous fluid, such as nitrogen gas or hydrocarbon gases, such as methane and mixtures of methane and heavier hydrocarbons, instead of carbon dioxide.

There is a need for a method to increase the permeability of carbon dioxide or other non-aqueous enhanced recovery fluid in the rock near injection wells, so as to increase the injection rate of this fluid into a reservoir at the same injection pressure and, thereby, allow more rapid recovery of the petroleum displaced by the enhanced recovery fluid.

SUMMARY OF THE INVENTION

A method of removing fluids from the near-well region to increase permeability of a non-aqueous enhanced recovery flooding fluid is provided. Aqueous liquids or petroleum are removed by a solvent which may be injected simultaneously with the enhanced recovery flooding fluid or in a slug ahead of the flooding fluid. Solvents are selected from alcohols, ketones or glycols having less than about 9 carbon atoms.

In one embodiment a mixture of carbon dioxide and methanol is injected to remove water or brine and residual crude oil ahead of a carbon dioxide flood. The method is repeated after subsequent injections of water or brine during the flooding process. In yet another embodiment, a slug of methanol is injected ahead of carbon dioxide. In all instances, the carbon dioxide is at conditions above critical pressure and temperature.

DETAILED DESCRIPTION OF PREFERRED EMBODIMENT

Figure 1:
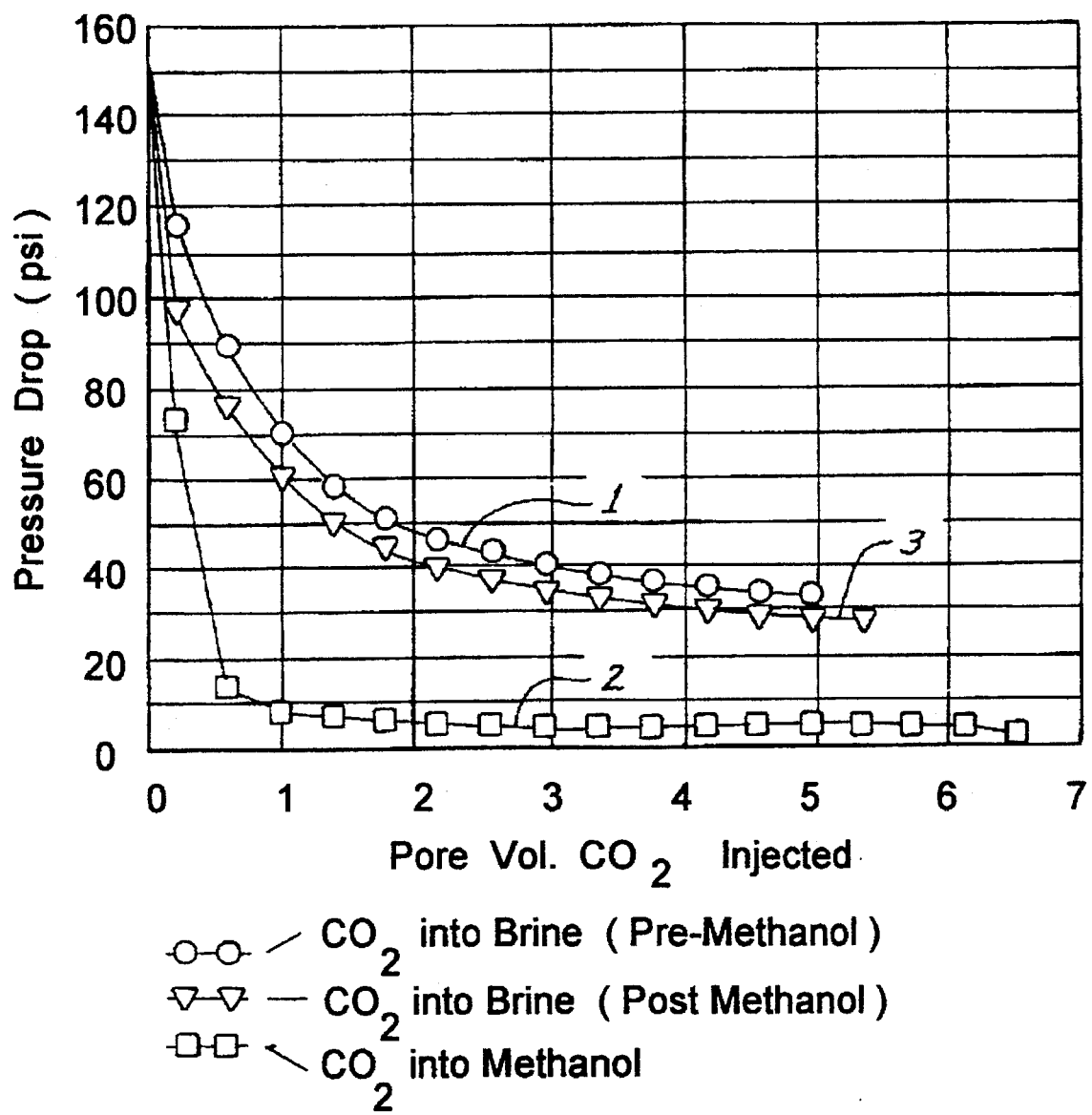
FIG. 1, curves 1 and 3 show the results of pressure drop measurements as a function of pore volumes of carbon dioxide injected through a brine-saturated core in the cases of pre-methanol and post-methanol injection, respectively, whereas curve 2 shows the pressure drop while injecting carbon dioxide immediately after methanol had been injected into the brine-saturated core.

Experiments in core samples were performed to determine the benefits of solvent injection in increasing the injectivity of a flooding fluid. A core sample taken from a West Texas field and still containing crude oil was placed under representative reservoir conditions. The core sample was 1.5 inches in diameter and 3 inches long. The pressure in the core was controlled by a back-pressure regulator to values between about 1600 and 1800 psi, while carbon dioxide was used as the flooding fluid. The core was from a field where the salinity of the water was 3.7% total dissolved solids. In a first step, brine having this composition was flowed through the core. Thereafter, carbon dioxide was flowed through the core at a rate of 150 ml/hr. Results of pressure drop measurements across the core are shown in FIG. 1. Curve 1 shows the pressure drop while injecting carbon dioxide at a temperature of 105° F. Pressure drop is shown as a function of pore volumes of carbon dioxide injected. After about 5 pore volumes of carbon dioxide was injected, brine was then flooded into the core again to obtain a high brine saturation. Thereafter, about 4 pore volumes of methanol was injected. Curve 2 shows the pressure drop while injecting carbon dioxide at the same rate of 150 ml/hr after methanol had been injected into the core. Pressure drop after methanol had been injected, as displayed in curve 2, was only about 10% of that before methanol injection. This ratio of pressure drop before solvent injection to pressure drop after solvent injection is defined as the "Local Improvement Ratio," which for this core was about 10.

The next step in the procedure was to inject brine again. This caused water saturation to increase to a high value, and simulated conditions around injection wells in carbon dioxide floods when there is alternate injection of carbon dioxide and water or brine. Following brine injection, carbon dioxide was injected again at the same rate of injection. Curve 3 shows the pressure drop of carbon dioxide. The pressure drop returned to near the original level, but somewhat less than before the first methanol injection. This demonstrates that the effect of the methanol is not to produce a permanent improvement in injectivity, but water injection following the methanol again requires a methanol or solvent injection to obtain high injectivity. Methanol, thus, must be used after every brine cycle to maintain the increased carbon dioxide injectivity. The somewhat lower injection pressure in curve 3 compared with curve 1 is likely caused by the fact that the methanol and carbon dioxide also removed some of the crude oil present in the core, thereby further increasing the relative permeability to carbon dioxide.

Figure 2:
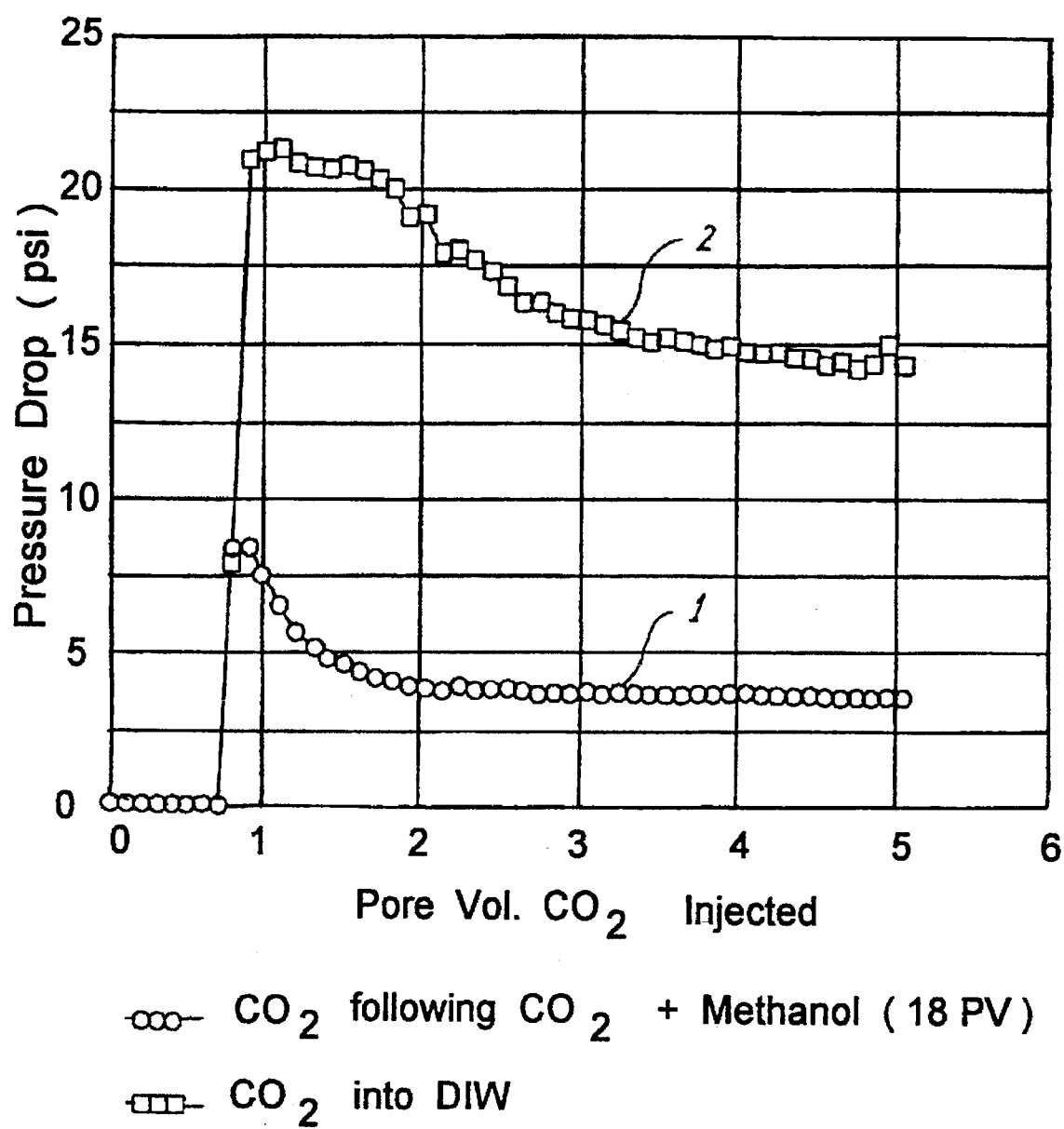
FIG. 2, curve 1, shows the results of pressure drop measurements across the core sample for an 18 pore volume injection of carbon dioxide and methanol followed by carbon dioxide, as compared with the injection of carbon dioxide into deionized water, shown in curve 2.

If salinity of the reservoir water is high, precipitation of salt can occur when the water-miscible solvent is injected and this can cause blockage of the pores of a rock. Therefore, in high salinity reservoirs, it is necessary to inject a low salinity or fresh water slug ahead of the water-miscible solvent to avoid precipitation of salt. A core from a second West Texas reservoir, in which brine salinity was about 10% total dissolved solids, was used in a separate experiment. De-ionized water (DIW) was used ahead of the solvent to avoid core plugging. In this experiment carbon dioxide and methanol were injected simultaneously, the carbon dioxide being injected at a rate of 9 ml/hr and the methanol at a rate of 1 ml/hr. This process also worked well to increase carbon dioxide injectivity. Several lengths of time for simultaneous injection were investigated. In FIG. 2, curve 1, results of pressure drop measurements across the core sample are shown for 18 pore volume injection of carbon dioxide and methanol, followed by carbon dioxide. This is an equivalent pore volume of 1.8 of methanol injection. Notice that the pressure drop at the same rate of injection was reduced over a factor of 4 after the methanol and carbon dioxide injection, compared with carbon dioxide into de-ionized water, shown in curve 2. Therefore, the Local Improvement Ratio value for this core was about 4.

Tests in this same core showed that when 10% brine was injected into a methanol-filled core, pressure drop increased rapidly to very high values of about 450 psi. This plugging of the core was caused by precipitation of salt from the brine. If instead of the 10% brine, a 2% potassium chloride solution was injected into the same core following methanol injection, the pressure remained at a low value of about 30 psi. These tests demonstrate that interaction of high salinity reservoir brine and methanol can cause plugging of cores.

Measurements of the Local Improvement Ratio after injection of methanol for carbon dioxide injection in different cores from different fields in West Texas resulted in values from about 2.5 to about 10.

Figure 3:
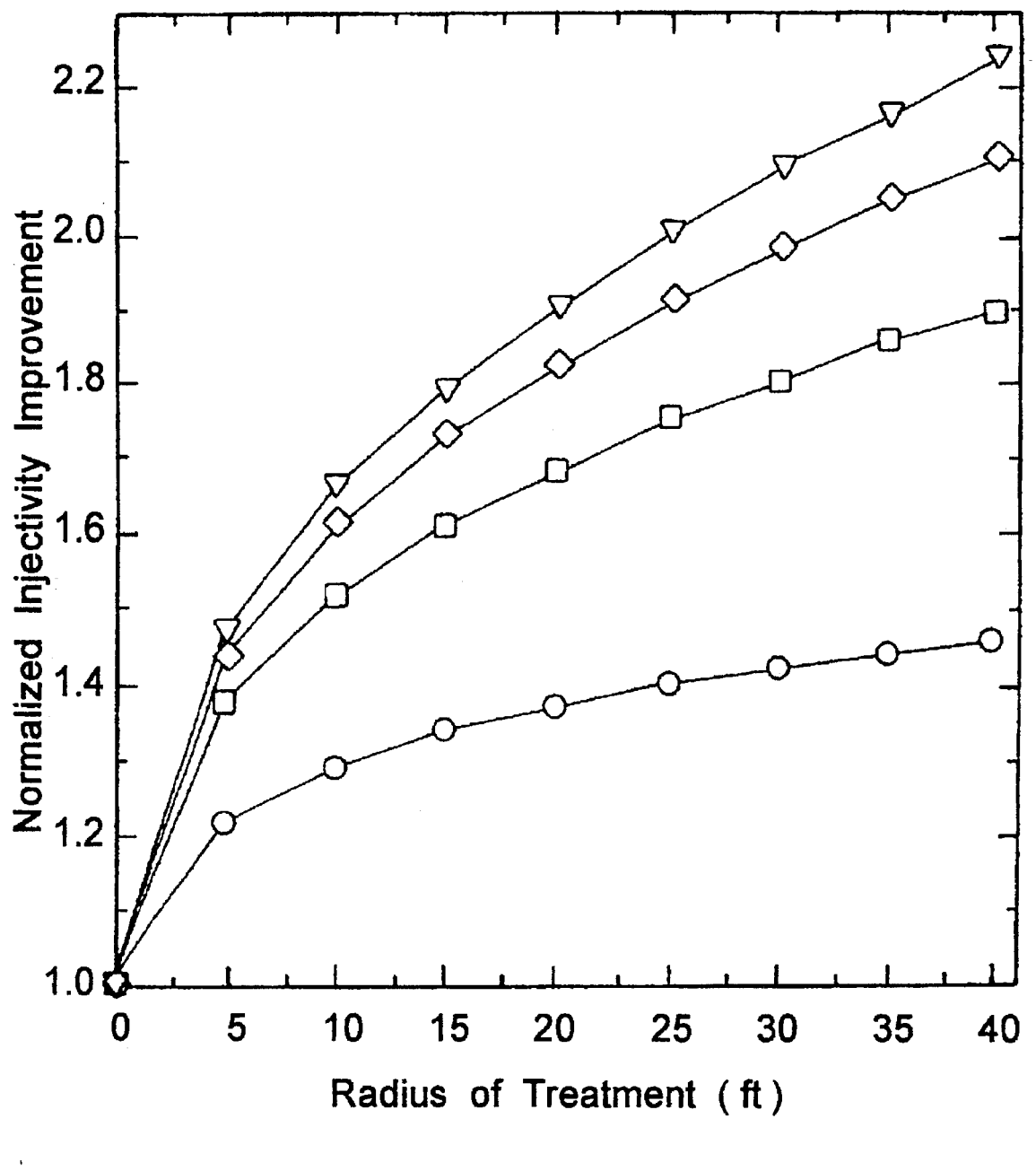
FIG. 3 depicts curves representing Normalized Injectivity Improvement for different radii of treatment zones around a well for Local Improvement Ratios of 2, 4, 6 and 8, respectively.

Results of Local Improvement Ratio measurements in cores can be used to predict effects of injectivity into wells in the reservoirs from which the core samples are obtained. A flow model assuming radial flow in a reservoir was used for this prediction. The following parameters were assumed: wellbore radius 0.33 ft, outer reservoir radius 660 ft, porosity of the reservoir rock 10% and thickness of the reservoir 70 ft. These calculations were performed for different radii of the zone around a well in which relative permeability to the flooding fluid is increased by different Local Improvement Ratios. Results of the calculations are shown in FIG. 3 for Local Improvement Ratios of 2, 4, 6 and 8. These Ratios span those observed in most of the laboratory core floods. Normalized Injectivity Improvement, shown in the figure, is defined as injectivity with the treatment of this invention divided by injectivity with no treatment. Similar curves may be prepared for other values of the parameters from equations for injectivity of wells or computer simulations of flow in reservoirs, using techniques well-known in the industry.

The optimum amount of polar solvent to be injected into an injection well will depend, among other factors, on the Local Improvement Ratio for the near-well region around the injection well. Referring to FIG. 3, it is apparent that if the Ratio is only 2, a radius of treatment of about 15 ft provides most of the benefits that can be attained by the method of this invention. If, however, the Local Improvement Ratio is 8, incremental benefits are still realized to greater radii of the zone of treatment. A radius of treatment greater than about 50 ft would not be anticipated in any injection well, however. An optimum amount of polar fluid may be selected for an injection well by core tests and calculations such as shown in FIG. 3, by calculating the costs of different amounts of polar liquid and the reduced time required to operate the recovery process. Results from applications in wells will then be used to further optimize the amount of polar liquid which produces the best overall economic benefits.

Although the previous disclosure is limited to the use of methanol, other polar solvents can be used which have similar properties to methanol in that they are water miscible, such that they displace the reservoir water away from an injection well, and they are vaporized or go into solution in the flooding fluid which follows. They may also mix with the flooding medium, in the case of carbon dioxide, to increase the solubility of crude oil or heavy fractions of crude oil in the mixture, thereby improving removal of crude oil from the near-well region, also. Polar solvents which are alcohols and which are suitable include methanol, ethanol, propanol and higher carbon-number alcohols up to about 9 carbon atoms. Polar solvents which are ketones and which are suitable include acetone and higher carbon-number ketones up to about 9 carbon atoms. Polar solvents which are glycols and which are suitable include mono-, di-, and tri-ethylene glycol. These polar solvents preferably have high miscibility with water or brine which is present in the reservoir when they are injected and high solubility or volatility in the subsequent enhanced recovery flooding fluid. The flooding fluid may be carbon dioxide, nitrogen or a hydrocarbon gas such as methane or mixtures of methane and heavier hydrocarbons. The polar solvent may be injected as a slug or bank of material or may be injected in a mixture with the flooding fluid. Mixtures of the polar solvents may be used, such as a mixture of an alcohol and ketone or alcohols with different carbon numbers.

EXAMPLE

A reservoir in West Texas is flooded by carbon dioxide. In order to improve the sweep efficiency of the carbon dioxide, a bank of reservoir brine is injected after each slug of carbon dioxide. The reservoir has 70 feet of net pay, has a porosity of 10%, and the wells are on 40-acre spacing in a 5-spot pattern. The improvement in injectivity of the injection well in the center of the 5-spot can be approximated by the curves of FIG. 3.

Tests show that about 0.5 pore volume slug of methanol is effective for treating one pore volume of pore space. It is assumed that 0.5 pore volume slug of methanol is injected in the zone to be treated. A 15-foot radial treatment therefore requires about 20,000 gallons of methanol. At a cost of 50¢ per gallon for methanol, the cost of each treatment is about $10,000. Core tests using techniques described above and core samples from this reservoir show that methanol injection ahead of carbon dioxide results in a Local Improvement Ratio of about 4. Referring to FIG. 3, for a 15-foot radius treatment, the Normalized Injectivity Improvement is about 60%. Each time water is injected followed by carbon dioxide during the flood, a $10,000 slug of methanol is injected ahead of the carbon dioxide. This increases injectivity during the subsequent carbon dioxide treatment by 60% and decreases the time of the flood from an estimated 10 years, based on a total of 5 years of water injection in 4 slugs, to about 8 years with the improved water injectivity method of this invention. Although there may not be a significant increase in the amount of crude oil which is recovered with the treatment of this invention, the elimination of operating expenses of the wells in the flood by 2 years and the more rapid recovery of the investment in carbon dioxide pays for the $40,000 cost of methanol and produces a substantial profit.

It will be appreciated that while the present invention has been primarily described with regard to the foregoing embodiments, it should be understood that variations and modifications may be made in the embodiments described herein without departing from the broad inventive concept disclosed above or claimed hereafter.

What is claimed is:

1. A method for increasing the sweep efficiency and decreasing the time to complete a petroleum recovery process, comprising the steps of:

injecting a selected amount of a polar solvent into an injection well;

injecting a non-aqueous flooding fluid;

injecting water or brine into the injection well;

injecting a selected amount of a polar solvent into the injection well; and thereafter injecting the non-aqueous flooding fluid into the injection well to recover petroleum from the formation.

2. The method of claim 1, wherein the polar solvent is methanol.

3. The method of claim 1, wherein the non-aqueous flooding fluid is carbon dioxide above its critical pressure and temperature.

4. The method of claim 1, comprising the additional step, before injection of the polar liquid, of injecting an aqueous liquid having lower salinity than the water present in the formation.

5. The method of claim 1 wherein the polar solvent is injected as a mixture with the non-aqueous flooding fluid.

6. A method for increasing the injectivity of a non-aqueous flooding fluid into a well drilled through a subterranean formation containing petroleum, comprising:

injecting through the well an amount of polar liquid miscible with water under conditions in the formation, the polar liquid selected from the group consisting of acetone, ketone, and glycol, the amount being selected to provide a selected radius of treatment around the well; and thereafter injecting a non-aqueous flooding fluid to recover petroleum from the formation.

7. A method for increasing the injectivity of a non-aqueous flooding fluid into a well drilled through a subterranean formation containing petroleum, comprising:

injecting an aqueous fluid having a lower salinity than the water present in the formation;

thereafter injecting through the well an amount of polar liquid miscible with water under conditions in the formation, the polar liquid having less than about 9 carbon atoms, the amount being selected to provide a selected radius of treatment around the well; and thereafter injecting a non-aqueous flooding fluid to recover petroleum from the formation.

* * * * *